United States Patent
Enders et al.

(10) Patent No.: US 6,866,238 B2
(45) Date of Patent: Mar. 15, 2005

(54) FURNITURE PILLAR

(75) Inventors: Stephan Enders, Koblenz (DE); Holger Maus, Bettendorf (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/463,035

(22) Filed: Jun. 17, 2003

(65) Prior Publication Data

US 2004/0041063 A1 Mar. 4, 2004

(30) Foreign Application Priority Data

Jun. 18, 2002 (DE) .......................................... 102 27 201

(51) Int. Cl.[7] .............................................. A47B 96/14
(52) U.S. Cl. ....................... 248/599; 248/161; 248/631; 267/64.12; 384/276
(58) Field of Search ..................... 297/344.19; 384/276; 267/64.12, 64.11; 248/599, 622, 630, 631, 414, 404, 161, 565, 422

(56) References Cited

U.S. PATENT DOCUMENTS

| | | | | |
|---|---|---|---|---|
| 3,788,587 A | * | 1/1974 | Stemmier ................... | 248/562 |
| 4,139,175 A | * | 2/1979 | Bauer ......................... | 248/404 |
| 4,245,826 A | * | 1/1981 | Wirges ....................... | 248/565 |
| 4,485,996 A | * | 12/1984 | Beukema et al. ........... | 248/407 |
| 4,899,969 A | * | 2/1990 | Bauer et al. ................. | 248/161 |
| 4,969,619 A | * | 11/1990 | Bauer et al. ................. | 248/161 |
| 4,979,718 A | * | 12/1990 | Bauer et al. ................. | 248/631 |
| 5,131,615 A | * | 7/1992 | Hosan et al. ................ | 248/161 |
| 5,161,786 A | * | 11/1992 | Cohen ....................... | 267/64.12 |
| 5,413,414 A | * | 5/1995 | Bauer ......................... | 248/161 |
| 5,433,409 A | * | 7/1995 | Knopp ....................... | 248/161 |
| 5,443,573 A | | 8/1995 | Thiele et al. | |
| 5,556,170 A | * | 9/1996 | Lai et al. ................. | 297/463.1 |
| 5,702,083 A | * | 12/1997 | Lai ............................. | 248/404 |
| 5,992,815 A | * | 11/1999 | Metzdorf et al. ........... | 248/631 |
| 6,224,264 B1 | * | 5/2001 | Bohm et al. ............... | 384/220 |
| 6,474,619 B1 | * | 11/2002 | Ma ............................. | 248/631 |

FOREIGN PATENT DOCUMENTS

DE          100 38 520          2/2002

* cited by examiner

*Primary Examiner*—Anita M. King
(74) *Attorney, Agent, or Firm*—Cohen, Pontani, Lieberman & Pavane

(57) ABSTRACT

A furniture pillar includes an upright tube and a guide bushing which is inserted into one end of the upright tube and has an inner circumferential surface which is a guide for a supporting tube of the furniture pillar. The guide bushing has a radially inner guide tube, the tube passage of which forms a guide. An annular insertion region extends radially outwards on an end region of the guide tube and is inserted with its outer circumferential surface into the upright tube. A plurality of circumferentially spaced ribs of the guide bushing adjoin the annular insertion region axially, and extend radially outwards from the guide tube to outer end surfaces which bear against the inner wall of the upright tube, forming open chambers between them towards the side facing away from the annular insertion region. The upright tube has a color coating which completely covers its outer circumferential surface. Continuous openings pass from the chambers through the guide tube to the interior of the guide tube.

8 Claims, 3 Drawing Sheets

FURNITURE PILLAR

BACKGROUND OF THE INVENTION

1. Field of the Invention

The invention is concerned with a furniture pillar having an upright tube and a guide bushing which is inserted into the upright tube at one end and the radially encircling, inner circumferential surface of which is a guide for a supporting tube of the furniture pillar. The guide bushing has a radially inner guide tube, the tube passage of which forms the guide, having an annular insertion region which extends radially outwards on an end region of the guide tube and is inserted with its radially encircling, outer circumferential surface into the upright tube. The guide bushing further has a plurality of ribs, which adjoin the annular insertion region axially, are arranged at a distance from one another in the circumferential direction, extend radially outwards from the guide tube to end surfaces which bear against the inner wall of the upright tube, and form open chambers between them towards the side facing away from the annular insertion region. The upright tube has a color coating which completely covers its outer circumferential surface.

2. Description of the Related Art

The problems in upright tubes of this type involve the fact that if the guide bushing is inserted after the color coating has been applied, the color coating becomes damaged in the region of the inserted guide bushing. If, however, the guide bushing is inserted into the upright tube before the color coating is applied, then cleaning processes prior to the painting may cause water to collect in the region of the ribs in the guide bushing, this water then leading to disturbances in the production or to damage at a later time during further processing of the furniture pillar and during use of the item of furniture provided with the furniture pillar. Such liquid residues may also lead to corrosion.

SUMMARY OF THE INVENTION

It is therefore the object of the invention to provide a furniture pillar of the type mentioned at the beginning, in which accumulations of liquid, in particular accumulations of water in the region of the guide bushing, are avoided in a simple manner.

This object is achieved according to the invention by openings passing through some or all of the chambers leading through the guide tube to the interior of the guide tube.

Since the chambers which are formed between the ribs are connected to the interior of the guide tube, liquid accumulations can now run off out of the chambers through the openings into the interior of the guide tube and from there to the outside.

The liquid accumulations run off particularly readily if the openings are arranged in that end region of the chambers which faces the annular insertion region, since it is now possible for them to run out at both axial ends of the chambers.

So that the supporting tube in the upright tube uniformly absorbs force, the ribs can be distributed uniformly on the circumference of the guide tube.

The guide tube may have, in the annular insertion region on its inner, radially encircling circumferential surface, axially extending grooves which are open towards the interior of the guide tube, protrude in each case with their one end axially into the region of a chamber and are connected to these chambers radially by the openings.

If those ends of the grooves which face away from the openings open axially outwards on the free end side of the annular insertion region, then when the furniture pillar is installed in the item of furniture, these grooves are used to equalize the pressure between the interior of the upright tube and the outside region when the supporting tube is displaced in the upright tube.

If the grooves have a depth which is equal to or larger than the wall thickness of the guide tube in the region of the chambers, then the radially directed openings are inevitably informed in the axial overlapping region of grooves and chambers without having to be produced separately.

To particularly secure the guide bushing in the upright tube, that axially free end of the annular insertion region which faces away from the ribs is connected to the free end of the upright tube in a form-fitting manner.

This is possible in a simple manner by the free end of the annular insertion region having an annular projection which projects radially outwards and is crimped by the free end of the upright tube.

For a fit which is reliably free from play, the guide bushing can be inserted into the upright tube with a press fit.

It is simple to produce if the guide bushing is an injection-molded part, in particular a plastic injection-molded part, in particular if those ends of the grooves which face away from the openings open axially outwards on the free end side of the annular insertion region. In this case, the grooves can be produced in a simple manner during the injection-molding process by axial slides which are placed into the injection mould, with the result that the injection mould is cost-effective and removal from the mould can take place axially without any problem.

An exemplary embodiment of the invention is illustrated in the drawing and will be described in greater detail below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
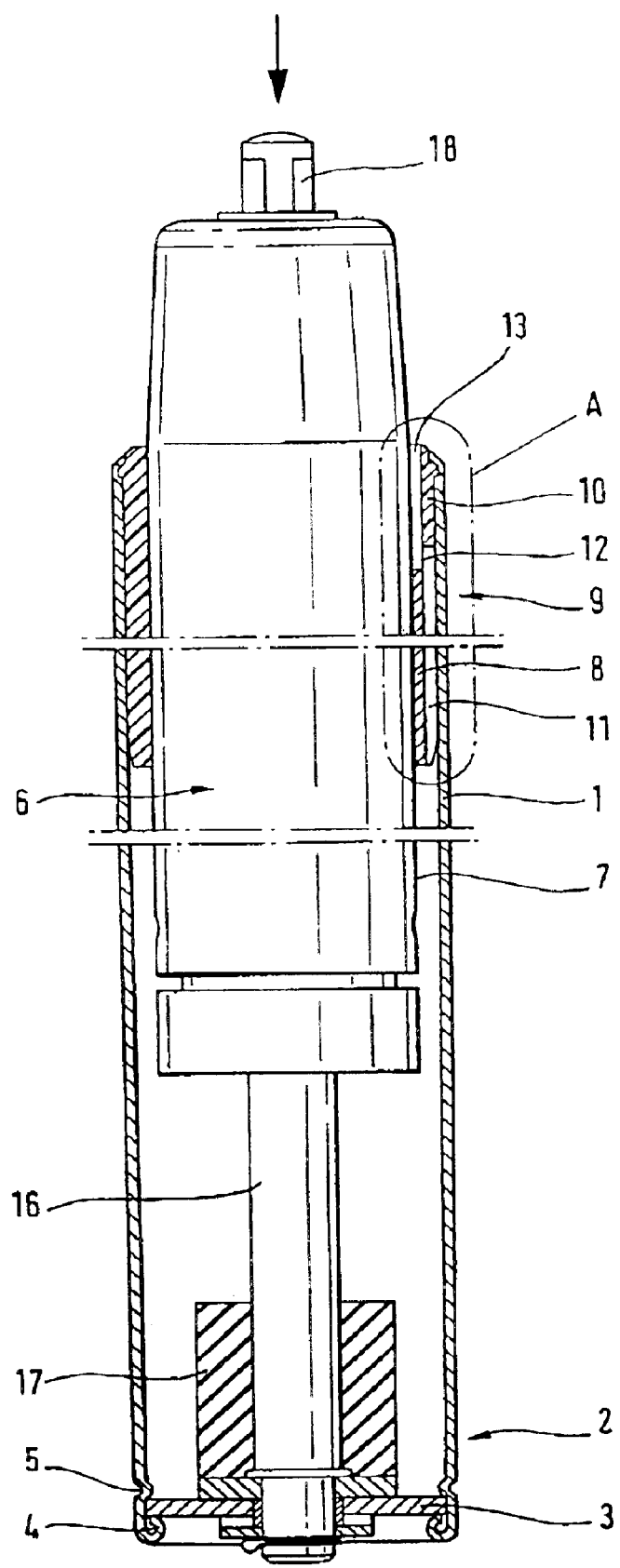
FIG. 1 shows a cross-sectional view of a furniture pillar.

The furniture pillar which is illustrated in the figures and is intended for a chair has an upright tube 1 with a base region 2 on which chair feet (not illustrated) which are used for standing on a floor can be arranged.

A supporting base 3 is arranged fixedly in the base region 2 of the upright tube by means of a crimping 4 of the upright tube and impressed areas 5 of the upright tube 1.

Furthermore, a blockable gas-filled spring 6 is arranged in the upright tube 1, the supporting tube 7 of which spring is guided axially in a sliding manner in the tube passage of a guide tube 8 of a guide bushing 9. The guide tube 8 is part of the guide bushing 9.

On one end region of the guide tube 8, the guide bushing 9 has a radially outwardly extending annular insertion region 10 which is inserted with its circumferentially uninterrupted radially outer circumferential surface into the upright tube 1 with a press fit.

The annular insertion region 10 is adjoined by a plurality of ribs 14, which ribs extend axially into the upright tube 1, are distributed uniformly in the circumferential direction at a distance from one another on the circumference of the guide tube 8, extend radially outwards from the guide tube 8 and with their radially outer end surfaces bear against the inner wall of the upright tube 1.

Chambers 11 which are open towards the side facing away from the annular insertion region 10 are formed between the ribs 14.

Figure 2:
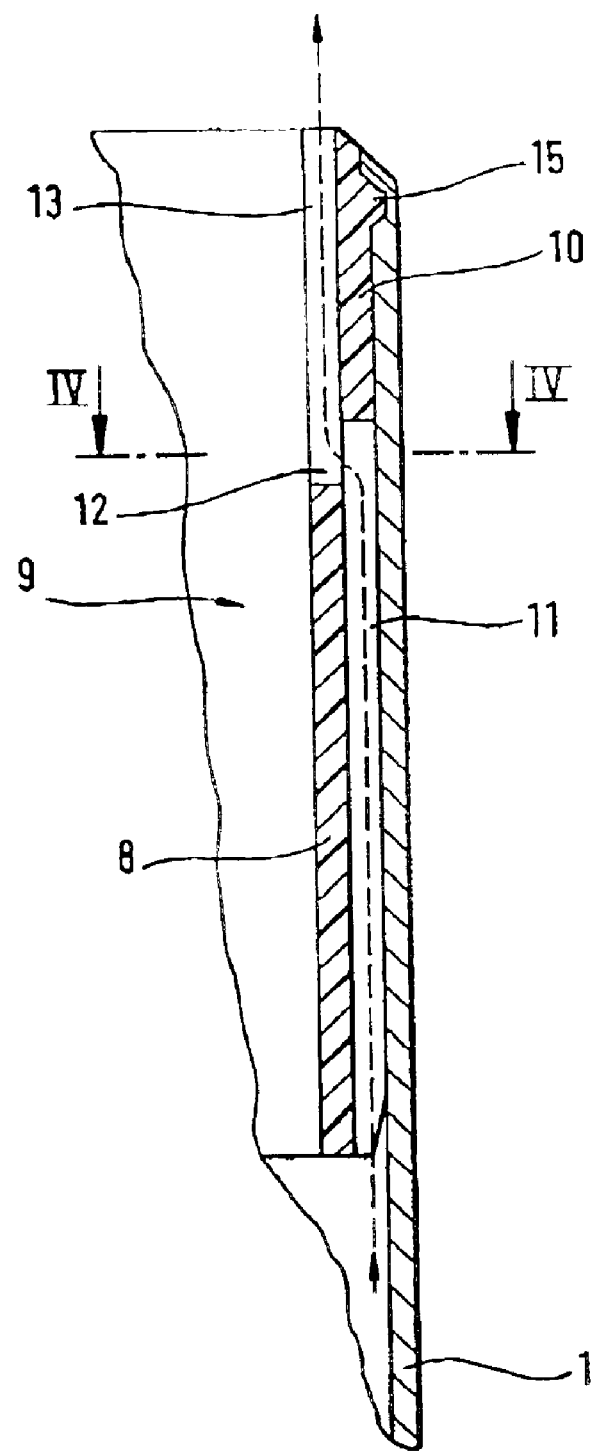
FIG. 2 is an enlarged view of the detail "A" from FIG. 1.
Figure 3:
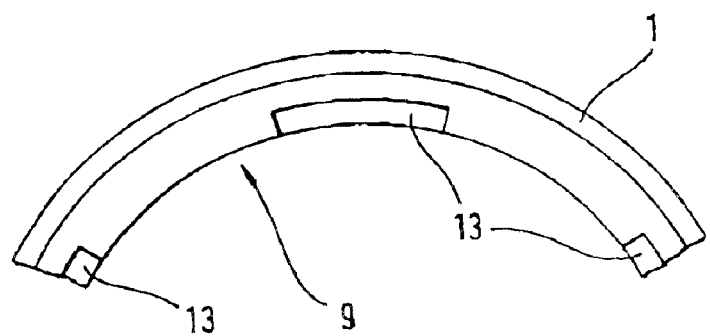
FIG. 3 is an end view of the detail "A" from FIG. 1.
Figure 4:
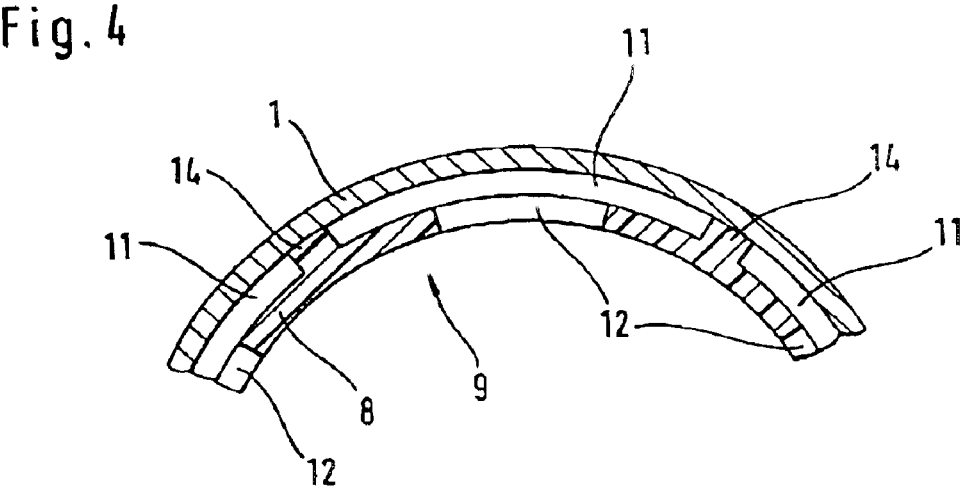
FIG. 4 is a cross section along the line IV—IV in FIG. 2.

As can be seen in particular in FIG. 2, continuous openings 12 lead from the chambers 11 through the guide tube 8 radially inwards to the interior of the guide tube 8.

The guide bushing 9 is an injection-molded part made from plastic.

The openings 12 are produced in a simple manner by axially extending slides being placed into the injection mold, these slides extending axially completely through the region of the annular insertion region which is to be produced as far as that region of the chambers 11 which is adjacent to the annular insertion region 10 and being produced by the grooves 13. These grooves 13 open axially outwards at their one end on the free end side of the annular insertion region 10 and are open towards the interior of the guide tube 8. Since the depth of the grooves 13 is equal to the wall thickness of the guide tube 8, the radially directed openings 12 are inevitably formed in the overlapping region of grooves 13 and chambers 11 and do not have to be produced in a separate operation.

That free end of the annular insertion region 10 which faces away from the ribs 14 has a radially outwardly protruding, encircling annular projection 15 which is crimped by the free end of the upright tube 1. The outer circumferential surface of the complete upright tube 1, including the crimped region of the annular projection 15, is covered with a color coating.

A piston rod 16 of the gas-filled spring 6 extends towards the end which faces away from the guide bushing 9 and is fastened with its free end to the supporting base 3. At its end adjacent to the supporting base 3, the piston rod 16 is surrounded by an elastic stop ring 17 used as a buffer.

At that end of the gas-filled spring 6 which protrudes out of the upright tube 1 and to which a seat of the chair can be fastened, a release tappet 18 protrudes out of the gas-filled spring 6. An axial action upon this release tappet 18 enables those chambers of the gas-filled spring 6 which are separated from one another to be connected to one another by a piston of the piston rod 16 and enables the supporting tube 1 of the gas-filled spring 6 to be displaced axially with respect to the upright tube 1.

When such a relative displacement of the upright tube 1 and supporting tube 7 takes place, the connection of the interior space of the upright tube 1 via the grooves 13, the openings 12 and the chambers 11 brings about an equalization of pressure with the surroundings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A furniture pillar comprising:

an upright tube having a free end, an inner wall, an outer circumferential surface, and a color coating on said outer circumferential surface; and a guide bushing having an annular insertion region having a free end which forms an end of said guide bushing and having an outer circumferential surface which is received against said inner wall of said upright tube, a guide tube extending through said annular insertion region and having an inner circumferential surface which serves as a guide for a supporting tube of the furniture pillar, and a plurality of circumferentially spaced ribs which adjoin said annular insertion region axially and extend radially outwards from the guide tube to radial end surfaces which bear against the inner wall of the upright tube, said ribs forming therebetween open chambers extending axially away from said annular insertion region, said guide tube having a plurality of grooves in said inner circumferential surface and extending axially from the end of the bushing through the annular insertion region, said guide bushing further comprising openings which communicate between said grooves and respective said chambers, the annular insertion region being form-fitted in the free end of the upright tube.

2. A furniture pillar as in claim 1 wherein said openings communicate with said grooves adjacent to said annular insertion region.

3. A furniture pillar as in claim 1 wherein said ribs are distributed uniformly about the circumference of said guide tube.

4. A furniture pillar as in claim 1 wherein said grooves have a radial depth which is greater than or equal to the thickness of the guide tube adjacent to said chambers.

5. A furniture pillar as in claim 1 wherein the free end of the annular insertion region has an annular projection which protrudes radially outward and is crimped by the free end of the upright tube.

6. A furniture pillar according to claim 1 wherein said guide bushing is received in said upright tube in a press fit.

7. A furniture pillar as in claim 1 wherein said guide bushing is made of injection molded plastic.

8. A furniture pillar as in claim 1 wherein the outer circumferential surface of the annular insertion region is circumferentially uninterrupted.

* * * * *